E. H. BELDEN.
SPRING SUSPENSION.
APPLICATION FILED JAN. 6, 1919.
1,421,759.
Patented July 4, 1922.
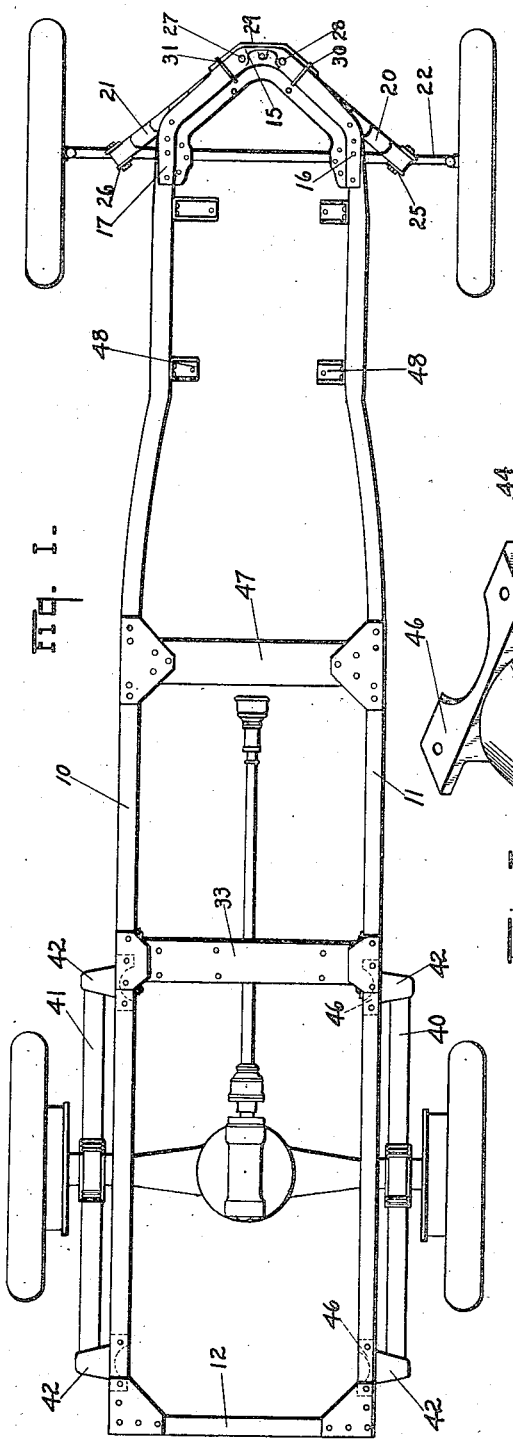
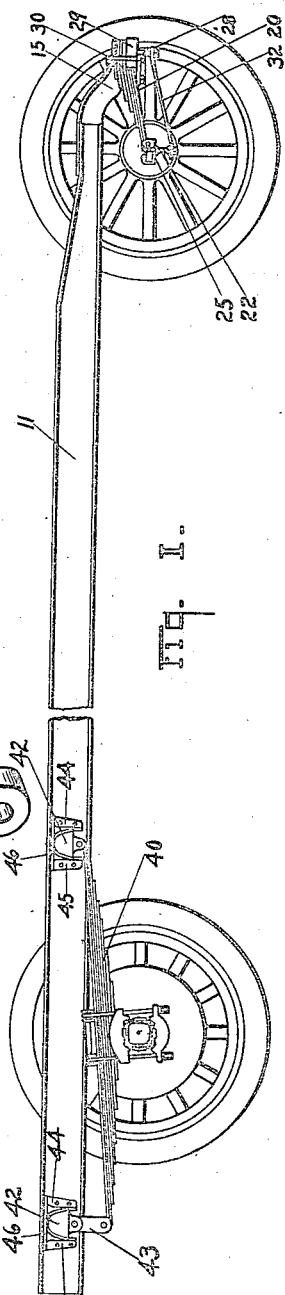
INVENTOR.
Edward H. Belden
BY
Chester W. Braselton
ATTORNEY

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SPRING SUSPENSION.

1,421,759.          Specification of Letters Patent.      Patented July 4, 1922.

Application filed January 6, 1919. Serial No. 269,806.

*To all whom it may concern:*

Be it known that I, EDWARD H. BELDEN, a citizen of the United States, residing at Toledo, in the county of Lucas and State of Ohio, have invented certain new and useful Improvements in Spring Suspensions, of which I declare the following to be a full, clear, and exact description.

This invention relates to improvements in the chassis of a motor vehicle, and more particularly in the frame construction thereof, together with a novel combination between the frame and the axles of the vehicle, and novel manner in which the frame is supported from the axles by the vehicle spring including a special arrangement of vehicle spring relative thereto.

An object of the invention is to provide improved spring suspension for motor vehicles of such a nature as to produce a strong, serviceable spring suspension for the chassis frame of a type which will permit the use of a shorter wheel base but at the same time have the qualities of a longer wheel base, such as permitting the use of a roomier body, the construction being particularly designed so that such suspension is adapted to support and carry relatively heavy loads, particularly over the rear axle, and at the same time have the advantageous functions referred to.

Further objects of the invention are to provide a spring suspension of the character referred to, in which certain springs may be arranged to resist lateral strains between the frame and the axles of a vehicle, at the same time being arranged to give the effect of the long wheel base just mentioned.

The invention also includes in effect a three-point suspension between the chassis frame as a whole and the springs of the vehicle, the arrangement being such that the frame may be supported centrally of the chassis by the springs at one axle, while at the other end the frame is supported on the axle by springs connected at either side, this combination in a suspension construction having certain advantageous results in use.

Further objects of this invention relate to a frame construction capable of economic manufacture and also to certain details of arrangement and parts tending to produce a strong frame construction as will hereinafter appear from the detailed description to follow. I accomplish the objects of my invention in one instance by the devices and means described in the following specification, but it is evident that the same may be varied considerably without departing from the spirit and scope of the invention, as pointed out in the appended claims. A structure constituting one embodiment of the invention, which may be the preferred, is illustrated herein, in which the accompanying drawing forms a part hereof, in which:

Figure I is a plan view of my improved chassis vehicle assembly suspension.

Figure II is a side elevation of one embodiment of the invention, while

Figure III shows a perspective view of one of the supporting shackles or brackets which may be used with one of the sets of springs employed to further insure a rigid connection between the chassis frame and a spring.

In the particular embodiment of my invention illustrated herein, it will be seen that the chassis frame is composed of a plurality of longitudinal channeled side bars 10 and 11 being disposed so that the flanges of the channels are turned outwardly. The rear end of the frame extends considerably beyond the rear axle and is provided with a cross beam 12 connecting the rear end of the side members 10 and 11. Preferably the front end of the side bar members are turned inwardly to narrow down the width of the frame so as to permit turning of the front wheels of the vehicle, as will be readily understood, and adjacent the forward end of the frames 10 and 11 I have provided an extension member 15 made generally in the form of a yoke connected at 16 and 17 to the side frame channels 11 and 10. It will be seen that this end yoke 15 forms an extension on the frame which may be separately made and riveted to the frame to avoid the necessity of bending the channel members themselves, although it is apparent that the channel members themselves could extend forward to form the portion of the frame made by the separate yoke 15. In the particular structure shown herein, this yoke member 15 is made from a Z-shaped strip of metal bent to form the unit, the upper flanges of the Z forming means to support the yoke and fix it to the side frame bars, the lower flanges being arranged to permit the assembly thereon of the several leaves of a certain type of spring employed herein without interfering with the number of leaves of the spring as would be the case were the leaves arranged between the flanges of a channel bar. The manner in which the forward end of the vehicle chassis frame is suspended by suitable springs from the front axle of the vehicle constitutes one of the essential features of my invention as a part of the whole suspension, wherein it will be seen that a plurality of longitudinally converging preferably cantilever springs 20 and 21 are connected at one of their ends to the front axle 22, and at their other ends to the front extended terminal or the yoke 15, the same being secured thereto in substantially the longitudinal axis of the vehicle chassis frame proper. It is apparent that the invention is not limited to the employment of cantilever springs, but that any other type may be used. However, in the structure illustrated, cantilever springs 20 and 21 are used, the same being pivoted at one end in suitable brackets 25 and 26 adjacent either end of the front axle, while bolts 27 and 28 pass through the yoke member 15 and springs to secure the same thereto centrally of the yoke. To further bind and attach the several springs of each of the sets to this yoke member, I may use an inverted channel plate 29 with the web located against the lowermost leaf of the several leaves of the spring and the flanges bearing against the edges of some of the leaves the plate extending from one of the sets of springs 20 to the other spring 21. The channel 29 is secured in place by yokes or stays 30 and 31. However, any suitable means other than those set forth may be employed for securing a set of springs converging longitudinally of the vehicle chassis to the central portion of the frame. If desired, in order to prevent undertwisting of the front axle relative to the vehicle frame, a plate or brace rod 32, shown in Figure II of the drawing, may be connected to the lower side of the front axle below the spring pivots on each side of the center of axle, said braces being connected at their outer ends by bolts 27 and 28 passing through the spring and connected to the yoke 15. It will be understood that a plate 32 may be connected on each side of the vehicle frame below each of the springs 20 and 21.

The spring suspension employed at the rear end of the frame may be of any type usually employed in connecting the rear of the frame of a vehicle to the rear axle thereof, the present invention being concerned with the general assembly or chassis combination heretofore suggested including as a part thereof a strong type of rear end suspension but not limited to any specific construction as to the rear spring assembly. In the type shown, I have illustrated a plurality of cantilever springs 40 and 41, located on either side of the frame and connected to the rear axle of the vehicle in any suitable manner. It will be noted that the front ends of these cantilever springs are pivoted directly to brackets 42, while the rear ends thereof are pivoted to brackets through the medium of a link or shackle 43. A suitable bracket 42 is illustrated in perspective in Figure III as being provided with extending side flanges 44 and 45 (45 not shown in this figure), adapted to be arranged vertically against the bottom face of the channel of the side frame members, while the bracket is also provided with a top flange 46, which may bear against the underside of the outwardly extending top flange on each of the side frame members by reason of the channels 10 and 11 having their flanges turned outwardly. Hence the bracket may be secured to the channel bars both through the vertical lateral flanges 44 and 45 and through the top flange or bearing surface 46. This construction provides a particularly strong pivoting means between the frame of a vehicle and the spring thereof, it being apparent, however, that any desired means may be employed for connecting or pivoting the springs to the frame. As shown, the particular type of chassis frame includes the plurality of transverse brace bars 33 and 47, and the power plant of the vehicle may be supported on brackets 48 arranged at the forward end of the chassis frame.

From the structure described, illustrating one embodiment of the invention, it will be seen that the chassis frame is connected to one of the axles of the vehicle by a pair of converging springs connected at one end to the axle, and at the other to the chassis frame substantially the longitudinal center thereof, whereas the frame is supported from the other axle of the vehicle by a type of suspension in which a connection between each spring and the frame is located on the longitudinal sides of the frame rather than centrally thereof, this suspension giving in effect three points of connection between the frame and its springs; one located at one end, and two located at the other, the construction also affording the effect of a long wheel base on a shorter frame construction, and presenting other advantages in a strong, rigid frame suspension as a whole. It is furthermore apparent that means are provided in the arrangement of certain of the springs whereby they prevent or resist lateral strain imposed between the frame and the axle of the vehicle, while the other springs and frame are so arranged and connected as to produce a strong, efficient suspension and the whole frame suspension presents a simplified construction having meritorious advantages.

While I have described the invention in more or less detail, and as being embodied in certain precise forms, as heretofore stated, I do not desire or intend to be limited thereto since on the contrary my invention contemplates broadly all proper changes as well as the omission of immaterial elements, and the substitution of equivalents therefor, as circumstances may suggest or necessity render expedient.

Having thus described my invention, what I desire to secure by Letters Patent of the United States, and claim, is:

1. In a motor vehicle, the combination of a frame, front and rear axles, a pair of springs connected directly to an axle and converging longitudinally of the chassis frame and connected to said frame centrally thereof, and a spring suspension between said frame and the other of said axles, comprising springs extending substantially parallel to the longitudinal axis of the vehicle.

2. In a spring suspension of the character described, the combination of a vehicle chassis frame, a spring suspension between said frame and an axle including a transversely arranged spring connected directly to said frame in substantially the longitudinal center line thereof, said suspension being connected at its ends directly to said axle at points spaced longitudinally of the vehicle from said central connection, and a suspension between said frame and the other axle of the vehicle connected to said frame at the sides thereof comprising springs arranged substantially parallel to the frame of the vehicle.

3. In a vehicle, the combination of a frame, front and rear axles, a pair of springs connected to said front axle and converging forwardly to said frame, means for connecting said springs to said frame, a second pair of springs connected to the rear axle of the vehicle and extending longitudinally of the vehicle frame and means to connect said last mentioned springs and frame.

4. In a vehicle, the combination of a frame, front and rear axles, a pair of single arm cantilever springs connected to said front axle and converging forwardly to said frame, means for connecting said springs to said frame, a second pair of springs connected to the rear axle of the vehicle and extending longitudinally of the vehicle frame and means to connect said last mentioned springs and frame.

5. A vehicle spring suspension, including springs connected to one axle of the vehicle, extending toward the adjacent end of the vehicle beyond said axle and connected directly to the vehicle frame centrally thereof, and springs connected to the other axle of the vehicle extending longitudinally of the vehicle and connected to the frame at separate points spaced from the longitudinal center of the frame.

6. An improved vehicle chassis frame suspension, including in combination a vehicle frame extending beyond the axles, a pair of springs connected directly with an axle and with the adjacent end of said frame, said springs converging relative to the axis of the frame to prevent lateral strain, a plurality of springs connecting said frame to the other axle of the vehicle extending longitudinally relative to the frame and connected to said axle and to said frame at the sides thereof.

7. In a chassis suspension of the character set forth, the combination of a vehicle frame, said frame extending beyond each of the axles of a vehicle, a pair of springs connected with one of said axles and converging longitudianlly of the frame and connected to the extended portion centrally thereof, and a pair of springs connected to the other axle of the vehicle and to said frame, said last mentioned springs extending longitudinally relative to the frame and connected thereto.

8. In an assembly of the character set forth, the combination of a running gear embodying two axles, a chassis frame including side bar members and end members, one of said end members constituting a frame extension beyond the adjacent axle, a pair of springs connected to said last named axle at one end and at their other end to the central portion of said frame extension, and a pair of springs connected to the other axle of the vehicle and to the side frame, said last mentioned springs being arranged longitudinally of the vehicle chassis.

9. A vehicle chassis construction of the character set forth having in combination a vehicle frame, said frame extending beyond one of the axles of the vehicle, a pair of springs connected to said extension centrally thereof and diverging therefrom to said axle adjacent each end thereof, and a pair of springs connected to the other axle of the vehicle and to said frame, said last mentioned springs extending longitudinally relative to the frame.

10. In a motor vehicle, the combination of a frame, a front axle, a rear axle, an extension for said frame beyond one of said axles, a pair of springs each connected at one end to said axle, said pair converging and extending upwardly to said frame, and a pair of springs connecting each side of said frame to the other axle, said last mentioned springs arranged substantially parallel to the longitudinal axis of the vehicle.

11. In a motor vehicle, in combination a frame, a front axle, a rear axle, and extensions on said frame extending beyond each of said axles, a pair of single arm cantilever springs connected at one end to said front axle adjacent either end thereof, and at their other ends to the front frame extension centrally thereof, and a pair of double arm cantilever springs connected to said rear axle and to the sides of said frame forwardly and rearwardly of said axle.

12. In a motor vehicle, in combination a frame, a front axle, a rear axle, and extensions on said frame extending beyond each of said axles, a pair of single arm cantilever springs connected at one end to said front axle adjacent either end thereof and at their other ends to the frame extension centrally thereof, and a pair of double arm cantilever springs connected to said rear axle and to said frame forwardly and rearwardly of said axle, said last mentioned springs located substantially parallel to the longitudinal axis of the vehicle.

13. In an automobile, in combination a front axle, a rear axle, a vehicle frame having side members extending beyond one of said axles, a spring construction for carrying said frame on said axle and supporting the same against excessive movement comprising cantilever springs for supporting each of said side members on said rear axle and extending substantially parallel to said side members, and a pair of cantilever supporting springs and flexible brace rods connected at their rigid ends to the extension for said side members located at a horizontal angle thereto, said last mentioned springs being connected at their movable ends at fixed points on said front axle adjacent the respective extremities thereof.

14. In a motor vehicle, in combination a vehicle frame, a front axle, a rear axle, said frame extending beyond said front axle, a pair of single arm multiple leaf springs rigidly connected at their rigid ends to said extension, said springs diverging downwardly and rearwardly from said frame to said front axle, the operative ends of said springs being operatively pivoted at fixed points on said front axle adjacent the respective extremities thereof, and a pair of springs extending longitudinally of said vehicle and parallel to the axis thereof connecting said rear axle to said frame at points spaced from the longitudinal center thereof.

15. In an automotive vehicle, a front axle, a rear axle, a frame having side bar members, a yoke forming an extension and connector at one end of the frame, a connector at the other end of said frame, a pair of diverging springs connected to said extension centrally thereof and to an axle adjacent the respective extremities thereof, and a pair of parallel longitudinally extending springs connecting the other axle to the frame adjacent the other end thereof.

16. In an automotive vehicle having a frame having an extension, a front axle, a rear axle, said frame adapted to carry a power plant and vehicle body, the combination therewith of a spring suspension for said extension comprising a pair of leaf springs of varying leaf lengths located to form a horizontal angle relative to the longitudinal axis of the vehicle, each spring of the pair being operatively connected to said axle adjacent an extremity thereof, the rigid ends of said springs connected to said extension centrally thereof, said springs converging from their operative connection with said axle to their connection with the frame, and a pair of parallel springs connected to the rear axle and to the other end of the frame at opposite points spaced from the longitudinal axis of the vehicle.

17. In a motor vehicle, in combination a frame, a front axle, a rear axle, a pair of longitudinally converging springs connected to said front axle at each extremity thereof and directly to said frame centrally thereof, and a pair of longitudinally extending parallel springs each connected to said rear axle and to the sides of the frame on either side of said axle.

18. In a motor vehicle, in combination a vehicle frame, a front axle, a rear axle, and extensions on said frame beyond each of said axles, a pair of converging single arm cantilever springs connected to said front axle at each extremity thereof and to the extended end of said frame centrally thereof, brace members between said front axle and said extension to prevent under-twisting of said axle relative to said frame, and a pair of substantially parallel rear springs connected to said rear axle and to the sides of said frame, each spring being connected to said frame at a plurality of points, one at the rear of said rear axle and one forwardly thereof.

19. In a motor vehicle, the combination of a frame, front and rear axles, a pair of cantilever springs connected to one of said axles, said springs converging longitudinally of the chassis frame and rigidly attached to said frame near the longitudinal center line thereof, and a spring suspension between said frame and the other of said axles, comprising springs extending substantially parallel to the longitudinal axis of the vehicle.

20. In a spring suspension of the character described, the combination of a vehicle chassis frame, a spring suspension between said frame and an axle, including a longitudinally and transversely arranged cantilever spring rigidly attached to said frame near the longitudinal center line thereof, a suspension between said frame and the other axle of the vehicle connected to said frame at the sides thereof, comprising springs arranged substantially parallel to the frame.

21. A motor vehicle spring suspension including springs connected at their outer ends to one axle of the vehicle and extending inwardly at an angle to the axle, the inner ends of the springs being connected directly to the vehicle frame near the longitudinal center line thereof, and springs connected to the other axle of the vehicle extending longitudinally of the vehicle and connected to the frame at separate points spaced from the longitudinal center of the frame.

22. A motor vehicle chassis frame suspension including in combination a vehicle frame, a pair of axles, a pair of cantilever springs connected at their outer ends to one of said axles, and rigidly attached at their inner ends to said frame, said springs converging relative to the longitudinal axis of the frame to prevent lateral strain, and a plurality of springs connecting said frame and the other axle extending longitudinally relative to the frame and connected to said axle and to said frame at the sides of the latter.

In testimony whereof, I affix my signature.

EDWARD H. BELDEN.

Certificate of Correction.

It is hereby certified that in Letters Patent No. 1,421,759, granted July 4, 1922, upon the application of Edward H. Belden, of Toledo, Ohio, for an improvement in "Spring Suspensions," an error appears in the printed specification requiring correction as follows: Page 3, claim 1, line 15, strike out the word "directly" and insert the same to follow the word "connected," line 17; and that the said Letters Patent should be read with this correction therein that the same may conform to the record of the case in the Patent Office.

Signed and sealed this 8th day of August, A. D., 1922.

[SEAL.]
KARL FENNING,
*Acting Commissioner of Patents.*